3,182,098
PURIFICATION OF CRYSTALLINE SUBSTANCES
Hendrik Frederik van Wijk, Amsterdam, Netherlands, assignor to Nederlandse Centrale Organisatie voor Toegepast-Natuurwetenschappelijk Onderzoek, The Hague, Netherlands, a corporation of the Netherlands
No Drawing. Filed Mar. 18, 1960, Ser. No. 15,811
Claims priority, application Netherlands, Mar. 23, 1959, 237,385
8 Claims. (Cl. 260—707)

The application relates to improvements in the purifying of a mass of crude crystals from impurities.

The principle of the absorption column and of washing the absorbed material present in the column by a solvent (the eluant) is generally known in the field of chromatography.

However, the method of washing crystals is not suitable for the removal of impurities which are not only present on the surfaces of the crystals, but which are absorbed in the crystals.

A known method of purifying crystals, such as naphthalene crystals, comprises the washing of crude naphthalene crystals with a solvent or a solvent mixture which should have great selectivity i.e. ability to remove contaminants and deleterious compounds from the crude naphthalene.

In the said prior art process, liquid crude naphthalene is discharged onto the surfaces of a pair of revolving cooling cylinders so as to form a sheet of crystallized naphthalene. The said sheet is peeled off by means of a knife edge and it is crushed to a fineness so as to be readily permeable to the washing medium.

In this known process the crystals are extracted by the washing medium so that an appreciable part of the impurities contained in the crystals are removed. When it is combined with the recovery of the solvent and the crude naphthalene it contains, the naphthalene is obtained in a good yield and relatively pure, but not yet quite white in colour. To obtain water-white naphthalene it is to be subjected to an additional vacuum distillation.

The object of the invention is to provide a process by which it is possible also to remove the impurities absorbed in the crystals to a remarkably high extent.

A further object of the invention is to provide for a method for purifying crystalline substances to a high extent, which method can also be applied on a laboratory scale with a high yield.

The invention comprises a process wherein a crude mass of crystals is powdered to a high degree of fineness, introduced into a container, and rinsed in a certain direction with a substantially saturated solution of crystals, having substantially the same composition as the said crude crystals, in a solvent having a substantial dissolving power for the main substance of the crystals as well as for the impurities contained therein, in such a way that the moving velocity of the forefront of the said rinsing solution is not larger than about 1 centimeter per minute, and preferably not larger than 0.5 centimeter per minute. The said treatment, including the powdering of the crystals, is repeated until a sufficient degree of purity is obtained.

To my surprise, I have found that by this process the most obstinate impurities can be removed to a degree which cannot be attained with the aid of other known purification methods, such as re-crystallizing. It was established by microscopic examination, that during the rinsing with the saturated solution certain crystals grow out at the expense of other crystals, or, in some cases, certain crystal surfaces grow out at the expense of other crystal surfaces (whereby for instance the irregularly shaped crystal fragments of the crystal powder turn into needle-shaped crystals), so that the process can be described as rinsing during a process of re-crystallization.

Preferably, a volatile solvent is used, which is evaporated on the discharge side (which will often be the upper side) of a column or layer of the impure crystals, after which, after the supply has been interrupted, a strongly contaminated layer of crystals, which is clearly discernible, can be removed. Hereby another large part of the main component which had previously been dissolved in the liquid is reclaimed in purified form, so that high yields are obtained.

However, in certain cases it is also possible to remove from the liquid, after it has been passed through the mass, a distinctly discernible impure layer. In order to obtain high yields the said removed layer may be pre-purified in any known way such as by means of active carbon black, by the usual re-crystallization method etc.

The phenomenon on which the process is based may be called extractive re-crystallization and the treatment semi-continuous re-crystallization.

For the treatment of smaller quantities the use of columns which are rinsed from the bottom upwards is preferred. The treatment of larger quantities may be effected in beds of a large size, which may be deposited on a conveyer belt and treated there.

The degree of fineness to which the crystals should be reduced is in the order of magnitude of 100 microns for the bulk of the material; in general at least 90% of the crystals or crystal agglomerates should have a diameter of at most 250 microns, but preferably of at most 100 microns.

Any further reduction in size is superfluous with regard to the effectiveness of my purifying process and it tends to make the treatment more expensive. The required degree of fineness can be obtained in various grinders, ball mills or hammer mills as is known in the art.

The purity obtained can conveniently be determined by means of a thermal analysis (by analysis of the melt-curve). If the molecular weight of the impurities is unknown, this method only gives a result in mol percents as is known in the art.

It is not necessary to bring the solvent used to saturation beforehand. It is often sufficient to supply the pure solvent, for in particular when crystals of sufficiently high dissolving velocity are used, it will at the temperature applied, soon change into a saturated solution.

In general, it is of advantage to select a moving velocity of the liquid in the direction of the movement which does not exceed 1 cm. a minute. Moving velocities of the forefront of the liquid of from 0.01 to 0.5 cm. per minute are preferably used. In general the moving velocity is selected such that a perceptible re-crystallization takes place during the time in which the liquid moves over a few crystal lengths. The solvent is chosen in such a way that the substance to be purified as well as the impurities to be removed are readily soluble. It is observed, that for this reason a different solvent will often be chosen here than for re-crystallization purposes, in which latter process it is requisite that, at the temperature at which the separation is effected (usually room temperature), the solubility of the main component be as small as possible.

When the impurities form mixed crystals with the main components, the purification according to my invention will become a more difficult process, but it is not impossible. Here, the selection of a suitable solvent is of great importance, as is also the selecting of the appropriate moving velocity of the liquid through the mass.

My invention is elucidated by the following comparative examples.

EXAMPLE I

A mixture of 80% by weight of naphthalene and 20% by weight of benzoic acid was finely powdered in a ball mill until about 90% of the particles had a diameter smaller than 100 microns.

A number of equal, vertically mounted cylindrical glass tubes, each of which was filled up with 5 grams of the said finely-powdered mixture were, at room temperature, rinsed from the bottom upwards with increasing quantities of a saturated solution of naphthalene in benzene which were supplied in such a way that the forefront had a speed of 0.2 cm. per minute. The amount of benzoic acid left behind in the column was measured by thermal analysis as a function of the amount of solution that had been supplied to the column.

Initially, the purity of the remaining naphthalene increased linearly to the quantity of the liquid that had been passed through, until a maximal purity of 96% had been reached (after passing about 12 cm.$^3$ of liquid). When more liquid, up to as much as 30 cm.$^3$ was passed through, no further progress in the purification can be established.

Subsequently, the substance left behind in the column, consisting of 96% of naphthalene and 4% of benzoic acid, was finely powdered again and subjected to a purification in a similar manner. After passing less than 12 cm.$^3$ of the solution at the same speed as the first time, a purity of over 99.9% of naphthalene was reached. When inspecting the column during the passage of the liquid, it appeared each time, that the initial fine powder changed into an agglomerate of crystals, which were at least one order of magnitude larger than those of the starting product.

EXAMPLE II

A mixture of 90% by weight of naphthalene and 10% by weight of alpha naphthol was powdered in a ball mill until about 95% of the particles had a diameter smaller than 100 microns. 3 grams of the finely powdered material were introduced into a vertically positioned glass tube.

Of a mixture consisting of 90% of naphthalene and 10% of α naphthol 3 grams of finely-powdered material were introduced into a glass tube. An amount of 3 cm.$^3$ of a solution, obtained by adding so much of the starting material to benzene that an observable unsoluble residue remained, was passed upwards through the column, at room temperature, so that its forefront had a speed of 0.1 cm. per minute. After it had passed through the column, this residue was dried through evaporation at the top of the column. The contaminated upper layer of the substance was removed; the remaining quantity of the substance, which contained more than 92% of the starting quantity of naphthalene, had a purity of over 99.3% (determined by thermal analysis).

For the sake of comparison a usual re-crystallization treatment, was carried out with the double quantity of the solvent (6 cm.$^3$) rendered a yield of 65% of naphthalene having a purity of 96.5%.

A similar treatment was carried out with 3 grams of a mixture consisting of 99% of naphthalene and 1% of naphthol. Through this mixture likewise, a solution was passed which had been brought to saturation with the starting product. After 3 cm.$^3$ of the liquid had been passed through, the solvent had been evaporated, and the contaminated top layer had been removed, a purity of 99.92% was reached, while the yield amounted to 98% relative to the starting quantity, of naphthalene (taking into account the naphthalene contained in the influent solution).

EXAMPLE III

A commercial sample of antipyrine was purified by re-crystallization from benzene. After a purity of 99.90 mol percent had been obtained, it appeared to be impossible to obtain a further purification by means of the usual re-crystallization process.

After this, the 99.90% antipyrine was brought into a vertically mounted glass tube in finely powdered form, and slightly more than an equal quantity by weight of a benzene solution saturated with 99.9% antipyrine was passed through, so that its forefront had a speed of 0.08 cm. per minute. After stripping off the solvent and removing the upper layer, the purity of the antipyrine amounted to 99.96%. (Overall yield of the last-mentioned treatment: over 90%.)

EXAMPLE IV

A benzoic acid which had already been purified to 99.75%, was further purified to 99.85% by one single usual re-crystallization treatment. However, the yield amounted to no more than from 40 to 50%.

When using my method of semi-continuous re-crystallization, a purity of 99.90% and a yield of about 90% were obtained.

A repetition of the entire process (the finely powdering included) resulted in a purity of 99.97%. (Yield about 90%.)

*Table*

VARIOUS SUBSTANCES, WHICH HAVE BEEN PURIFIED ACCORDING TO MY PROCESS OF SEMI-CONTINUOUS RE-CRYSTALLIZATION

| | M.P., °C. | Solvent | Impurity |
|---|---|---|---|
| 1. Diphenyl | 70 | Benzene | Resin. |
| 2. Naphthalene | 80 | do | Tar, aromates. |
| 3. Naphthalene | 80 | Ethyl alcohol. | β-naphthol, (mixed crystals). |
| 4. Naphthalene | 80 | Benzene | Benzoic acid. |
| 5. Tetraphenylethane | 210 | Tetra[1] | Lower homologues. |
| 6. Triphenyl carbinol | 160 | Acetone | Tar. |
| 7. β-naphthol | 130 | Benzene | Do. |
| 8. Anthraquinone | 285 | do | Do. |
| 9. Benzoic acid | 120 | do | Resin. |
| 10. Benzoic acid | 120 | do | Cinnamic acid. |
| 11. Phenyl acetic acid | 77 | do | Green colouring matter. |
| 12. Stearic acid | 70 | Ether or tetra.[1] | Oleic acid. |
| 13. Adipic acid | 150 | Benzene | Unknown. |
| 14. Phthalic acid anhydride | 130 | do | Resin. |
| 15. Dimethyl terephthalate | 140 | do | Unknown. |
| 16. Antipyrine | 110 | do | Resin, green fluorescent compound. |

[1] Carbon tetrachloride.

The numbers 1, 2, 5, 6, 7, 8, 9, 11, 13, 14, 15 and 16 are commercial products, which had already been brought to a purity of 99.5% or more by usual re-crystallization treatment. Further purification by means of said usual re-crystallization treatment appeared to be either impossible or possible only at the cost of great losses in substance.

I claim:

1. A process for purifying a crystalline substance comprising the steps of finely dividing the crystalline substance, forming a bed of the finely divided crystalline substance, and rinsing the bed in one direction with a substantially saturated solution of crystalline substance having substantially the same composition as the crystalline substance in a solvent therefor, the moving velocity of the forefront of the solution during its introduction into said bed being not greater than one centimeter per minute.

2. A process for purifying an organic crystalline substance comprising the steps of finely dividing the crystalline substance, forming a bed of the finely divided crystalline substance, rinsing the bed in one direction with a substantially saturated solution of said crystalline substance in a solvent therefor, the moving velocity of the forefront of the solution during rinsing being not greater than one centimeter per minute, removing the solution from the rinsed particles and repeating the sequence of finely dividing and rinsing the crystalline substance until the required purification is obtained.

3. A process as claimed in claim 2, wherein, in each treatment, the crystalline substance is subdivided to the extent that at least 90% of the crystals have a diameter of no more than 250 microns.

4. A process as claimed in claim 2, wherein the moving velocity of the forefront of the liquid is less than 0.5 centimeter per minute.

5. A process as claimed in claim 4, wherein, in each treatment, the crystalline substance is subdivided to the extent that at least 90% of the crystals have a diameter of no more than 100 microns.

6. A process as claimed in claim 2, wherein the liquid which arrives at the surface of the bed is evaporated to form a strongly contaminated surface layer of crystals on the bed, and the contaminated layer is subsequently removed.

7. A process for purifying an organic crystalline substance comprising the steps of finely dividing the crystalline substance, forming a bed of the finely divided substance, and rinsing the bed in one direction with a substantially saturated organic solvent solution of crystalline substance having substantially the same composition as the crystalline substance in the organic solvent, the moving velocity of the forefront of the solution during rinsing being not greater than one centimeter per minute.

8. A process for purifying an organic crystalline substance comprising the steps of finely dividing the crystalline substance, forming a bed of the finely divided crystalline substance, and rinsing the bed in one direction with a substantially saturated solution of said crystalline substance in an organic solvent therefor, the moving velocity of the forefront of the solution during rinsing being not greater than one centimeter per minute.

References Cited by the Examiner
UNITED STATES PATENTS

| 1,436,228 | 11/22 | Bassett | 23—297 |
| 2,902,520 | 9/59 | Chuffart | 260—707 |

IRVING MARCUS, *Primary Examiner.*

WALTER A. MODANCE, *Examiner.*